(12) United States Patent
Shimizu et al.

(10) Patent No.: US 7,738,215 B2
(45) Date of Patent: Jun. 15, 2010

(54) MAGNETIC HEAD SLIDER HAVING SPHERICAL OF ELLIPSOIDAL PROJECTION FORMED THEREON

(75) Inventors: Yuki Shimizu, Ibaraki (JP); Junguo Xu, Ibaraki (JP); Hidekazu Kohira, Kanagawa-ken (KR)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 629 days.

(21) Appl. No.: 11/728,213

(22) Filed: Mar. 23, 2007

(65) Prior Publication Data

US 2007/0253111 A1    Nov. 1, 2007

(30) Foreign Application Priority Data

Mar. 24, 2006    (JP)    ............................. 2006-082373

(51) Int. Cl.
  *G11B 5/60*    (2006.01)
(52) U.S. Cl. .................. 360/234.7; 360/236.5; 360/237
(58) Field of Classification Search ... 360/234.3–237.1, 360/122
See application file for complete search history.

(56) References Cited

U.S. PATENT DOCUMENTS 4,396,965 A * 8/1983 DeMoss ..................... 360/224

6,181,517 B1 * 1/2001 Yanagisawa et al. ..... 360/235.4

FOREIGN PATENT DOCUMENTS

| JP | 07-254248 | 10/1995 |
|---|---|---|
| JP | 2000-353370 | 12/2000 |
| JP | 2003-168273 | 6/2003 |

\* cited by examiner

*Primary Examiner*—A. J. Heinz
(74) *Attorney, Agent, or Firm*—Townsend and Townsend and Crew LLP; John Henkhaus

(57) ABSTRACT

Embodiments in accordance with the present invention provide a magnetic head slider capable of securing a larger flying margin even when position variations occur at the time of flying. Embodiments of the present invention also provide a magnetic head slider having an excellent flying following capability. A read element and a write element of a magnetic head slider are arranged on a spherical or ellipsoidal projection and this projection is formed on a thin film magnetic head part. This may prevent a flying margin from being reduced by variations in flying position and may prevent a manufacturing step from being caused on the spherical or ellipsoidal projection. Moreover, by making the constituent ratio of the thin film magnetic head part on an air-bearing surface of the magnetic head slider 100 to be 7% or more, the read element and the write element are arranged at a pressure center position on the center rail surface of the air-bearing surface. This may enhance a following capability when the slider flies.

13 Claims, 6 Drawing Sheets

distance from inflow end of slider (mm)

rate of alumina film in air-bearing surface of slider (%)

MAGNETIC HEAD SLIDER HAVING SPHERICAL OF ELLIPSOIDAL PROJECTION FORMED THEREON

CROSS-REFERENCE TO RELATED APPLICATION

The instant nonprovisional patent application claims priority to Japanese Patent Application 2006-082373, filed Mar. 24, 2006 and incorporated by reference in its entirety herein for all purposes.

BACKGROUND OF THE INVENTION

In a magnetic disk drive, the smaller the gap between the recording layer of a magnetic disk and the write/read elements of a magnetic head slider, the greater the recording density of information can be increased. For this reason, conventionally, if the flying height of the magnetic head slider is lowered, the recording density of information of the magnetic disk drive is enhanced. At the present time, the flying height of the magnetic head slider above the magnetic disk, that is, a distance from the surface of the magnetic disk to the lowest point of flying height of the magnetic head slider at the time of flying, has been reduced to about 10 nm. There is little margin for variation in the flying height for the magnetic head slider in consideration of variations in the flying height of the magnetic head slider caused by a change in temperature of the magnetic disk drive and a change in atmospheric pressure in or around the magnetic disk drive.

JP-A-2000-353370 (patent document 1) discloses a technology in which variations in the flying height of a magnetic head slider having a front pad and a rear pad can be reduced by forming a pressure control groove in a negative pressure groove on the air inflow side of the rear pad. JP-A-07-254248 (patent document 2) discloses a technology in which spherical projections are formed symmetrically in a longitudinal direction or in a lateral direction on the flat surface of an air-bearing surface to stabilize the flying height of a magnetic head slider. However, it has become difficult to secure the flying margin of the magnetic head slider by improving static flying characteristics by these measures.

BRIEF SUMMARY OF THE INVENTION

Embodiment of the present invention provide a magnetic head slider capable of securing a larger flying margin even when position variations occur at the time of flying. Embodiments of the present invention also provide a magnetic head slider having an excellent flying following capability.

A magnetic head slider of an embodiment of the present invention includes a slider and a thin film magnetic head part formed at an air outflow end of the slider. The slider and an air-bearing surface of the thin film magnetic head part have a front rail surface and a center rail surface formed across the slider and the thin film magnetic head part. The thin film magnetic head part of the center rail surface has a spherical or ellipsoidal projection formed thereon, and the projection has a read element and a write element arranged thereon.

In one embodiment, for example that shown in FIG. 1, the read element includes a lower magnetic shield, a magnetoresistance effect element, and an upper magnetic shield. The write element may be laminated on the upper portion of the read element, and the whole of the read element including the lower magnetic shield and the write element may be included in the projection. A read element 8 and a write element 9 of a magnetic head slider 1 are arranged on a spherical or ellipsoidal projection 12 and this entire projection is formed on a thin film magnetic head part 11. This may prevent a flying margin from being reduced by variations in flying position and may prevent a manufacturing step from being caused on the spherical or ellipsoidal projection 12.

In another embodiment, for example that shown in FIG. 5, in a magnetic head slider of the present invention, the ratio of film thickness of the thin film head part to the entire length of the air-bearing surface is 7% or more and may be 15% or less. By making the constituent ratio of the thin film magnetic head part on an air-bearing surface of the magnetic head slider 100 to be 7% or more, the read element 8 and the write element 9 are arranged at a pressure center position on the center rail surface 5 of the air-bearing surface. This may enhance a following capability when the slider flies. A spherical or ellipsoidal projection may be formed on a thin film magnetic head part, and a read element and a write element may be arranged on the projection. The projection or the read element and the write element may be arranged at the pressure center position of the center rail surface of an air-bearing surface.

Accordingly, embodiments of the present invention provide a magnetic head slider that may secure a larger flying margin even when position variations occur at the time of flying. Moreover, it is possible to provide a magnetic head slider having an excellent flying following capability.

For a more complete understanding of the present invention, reference is made to the following detailed description taken in conjunction with the accompanying drawings.

DETAILED DESCRIPTION OF THE INVENTION

Figure 1A:
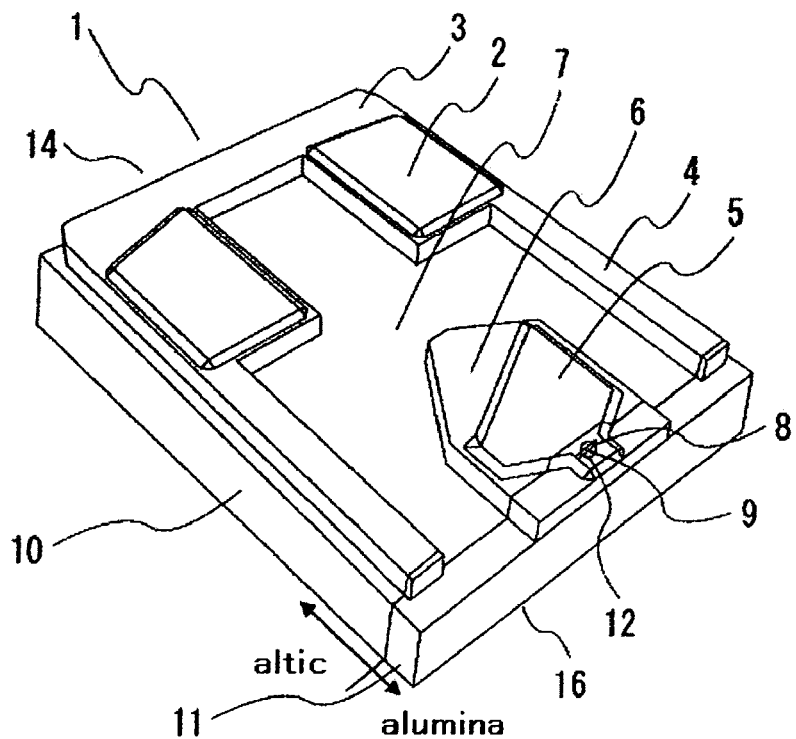
FIG. 1(a) is an exemplary view showing the shape of the air-bearing surface of a magnetic head slider according to an embodiment of the present invention.

Embodiments in accordance with the present invention relate to a magnetic head slider mounted in a magnetic disk drive. The construction of a magnetic head slider according to one embodiment of the present invention will be described with reference to the drawings. FIG. 1(a) is a bird's eye view to show the air-bearing surface of a magnetic head slider 1. The magnetic head slider 1 is constructed of a slider 10 and a thin film magnetic head part 11 formed on the air outflow end of the slider 10. The air-bearing surface of the magnetic head slider 1 is formed of: a front pad constructed of a front rail surface 2 and a front step bearing 3; a center pad constructed of side step bearings 4 connecting with the front step bearing 3, a center rail surface 5, and a center step bearing 6; and a negative pressure groove 7 for separating these pads. The center rail surface 5 is formed across the slider 10 and the thin film magnetic head part 11. The front pad, the center pad, and the negative pressure groove 7 may be formed by etching, such as ion milling. In one aspect, the negative pressure groove 7 is formed more deeply than the front step bearing 3, the side step bearings 4, and the center step bearing 6. A read element (reproducing element) 8 and a write element (recording element) 9 are formed in the thin film head part 11 and are positioned near the air outflow end of the center rail surface 5.

Figure 1B:
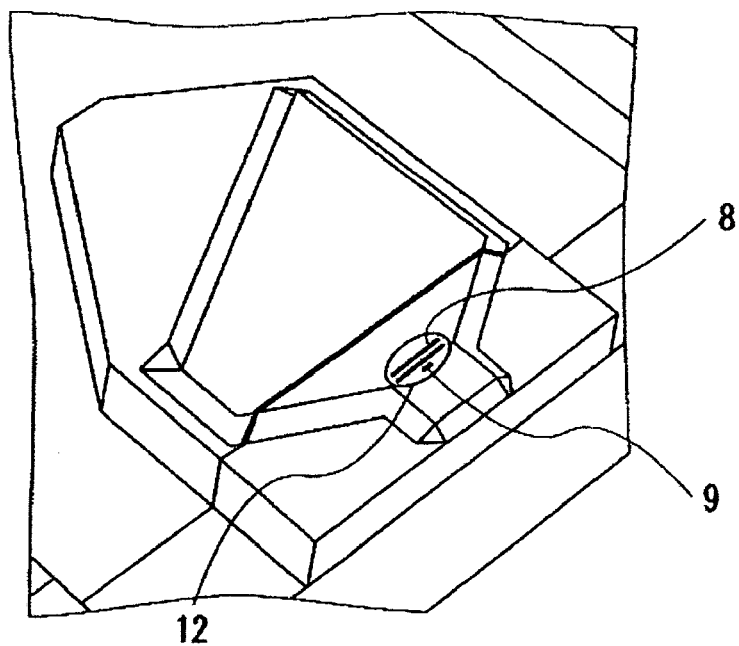
FIG. 1(b) is an exemplary enlarged view near a center pad according to an embodiment of the present invention.

In one embodiment, the slider 10 is constructed of alumina titanium carbide (altic: $Al_2O_3$—TiC) and the thin film head part 11 is constructed of alumina ($Al_2O_3$). As shown by an enlarged view near the center rail surface 5 in FIG. 1(b), the read element 8 and the write element 9 are formed in an alumina layer deposited on an attic substrate by a thin film forming process. The read element 8 is a magnetoresistance effect type head constructed of a lower magnetic shield, a magnetoresistance effect element, and an upper magnetic shield, and the write element 9 is an induction type magnetic head. In this embodiment, the read element 8 and the write element 9 are included in a spherical or ellipsoidal projection 12 on the center rail surface 5 of the center pad, and this entire projection 12 is formed in the alumina part (thin film head part) 11. The spherical or ellipsoidal projection 12 may be formed, for example, by a method described in a patent document 2.

Figure 2:
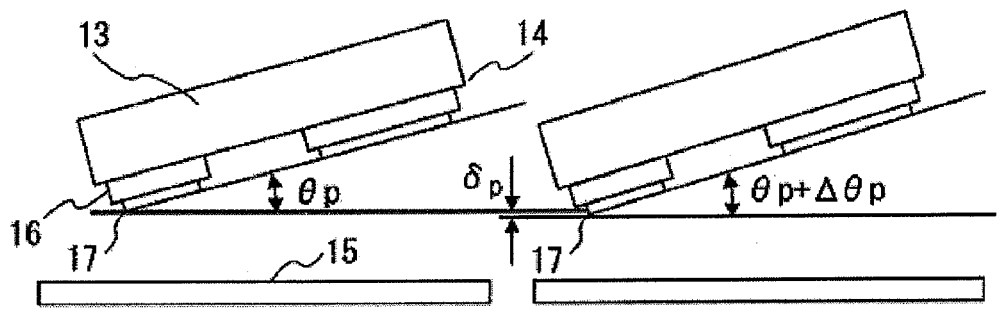
FIG. 2(a) is an exemplary side view of a flying state in the related art.
FIG. 2(b) is an exemplary side view of a flying state according to an embodiment of the present invention.
Figure 2:
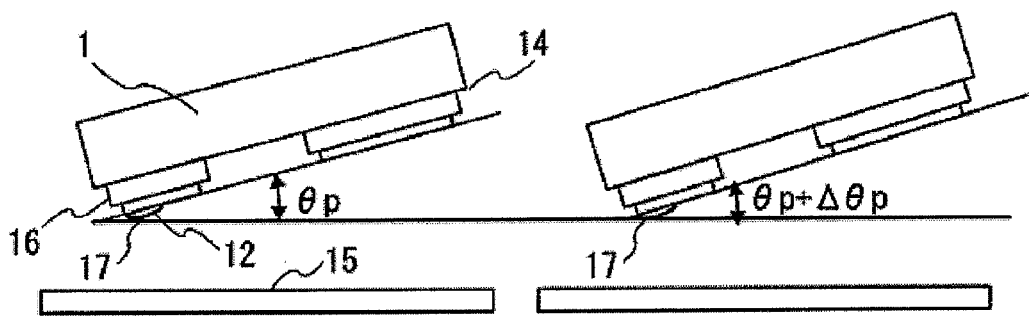

The effect produced by the above-mentioned construction will be described by the use of FIG. 2 to FIG. 4. FIG. 2 is a schematic side view of when a magnetic head slider is in a state where it flies over the magnetic disk. FIG. 2(a) is a typical magnetic head slider 13 in the related art, and FIG. 2(b) is the magnetic head slider 1 according to an embodiment of the present invention. Usually, the magnetic slider 1 (or 13) flies over a rotating disk 15 such that a gap between the magnetic head slider 1 (or 13) and the magnetic disk 15 at an air inflow end 14 becomes larger than a gap between the magnetic head slider 1 (or 13) and the magnetic disk 15 at an air outflow end 16, that is, at a pith angle of θp.

Here, the pith angle of θp when the magnetic head slider flies is changed by the effect of a disturbance or the like. In the magnetic head slider 13 of the related art as shown in FIG. 2(a), the flying height of the lowest point 17 when the magnetic head slider flies is changed by a change Δθp in the pitch angle θp and a distance in the direction of the height between the read element 8, the write element 9 and the lowest point 7 is decreased by δp. That is, the margin of the flying height of the distance, which is traveled by the magnetic head slider 13 until the magnetic head slider 13 contacts the surface of the magnetic disk 15, is lost by δp.

In contrast, in the magnetic head slider 1 of the embodiment shown in FIG. 2(b), the read element 8 and the write element 9 are arranged on the spherical or ellipsoidal projection 12. The flying height of the lowest point 17 when the magnetic head slider flies is hardly changed by a change in the pitch angle θp. That is, the margin of the flying height of the distance, which is traveled by the magnetic head slider 1 until the magnetic head slider 1 contacts the surface of the magnetic disk 15, is hardly lost.

Figure 3:
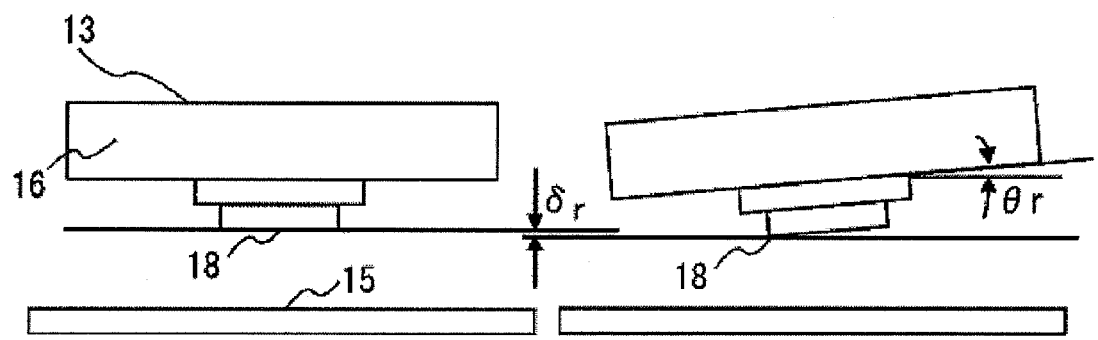
FIG. 3(a) is an exemplary view when the related art is viewed from an air outflow end.
FIG. 3(b) is an exemplary view from the air outflow end according to an embodiment of the present invention.
Figure 3:
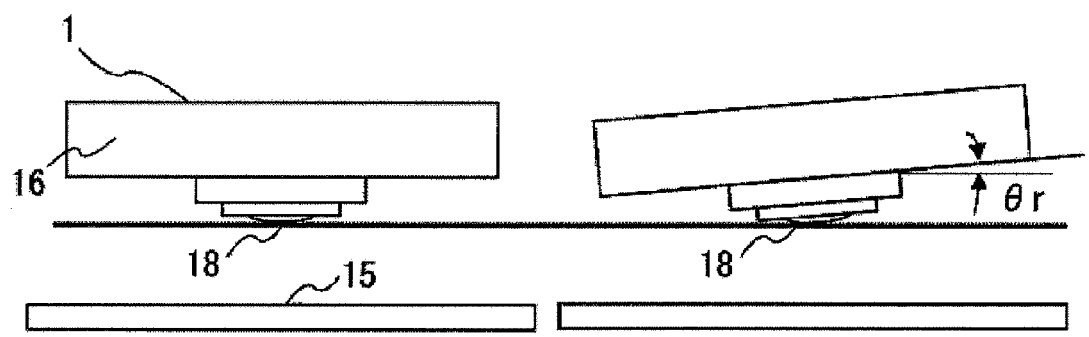
Figure 4:
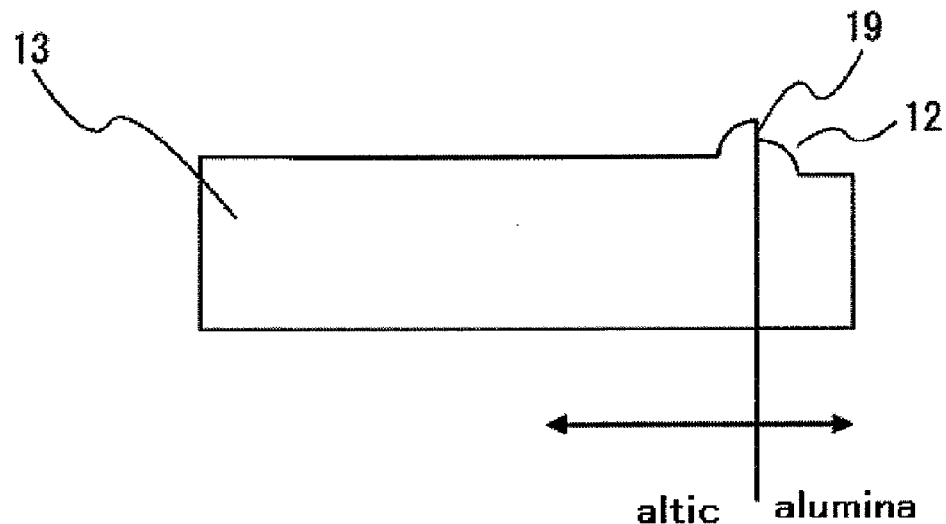
FIG. 4(a) is an exemplary diagram to show the related art in which a manufacturing step is produced.
FIG. 4(b) is an exemplary diagram to show that a manufacturing step is not produced according to an embodiment of the present invention.
Figure 4:
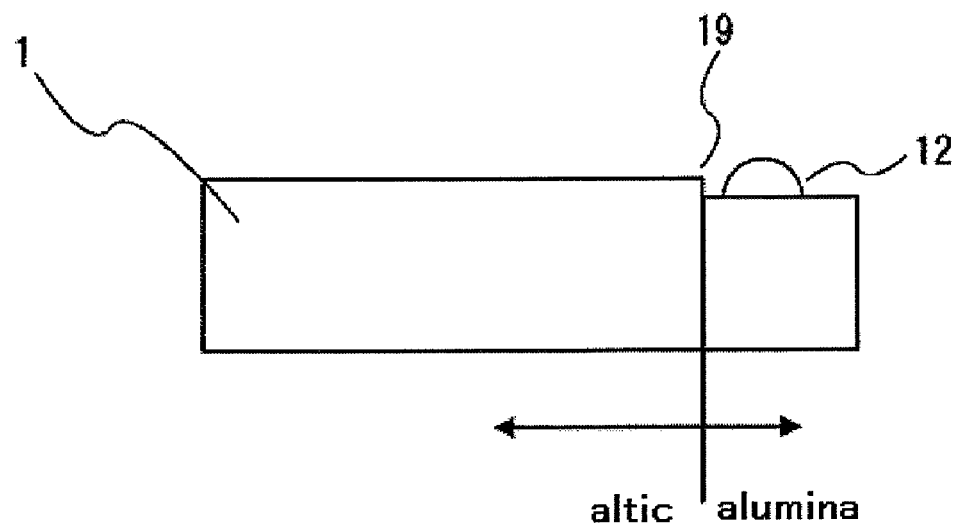

FIG. 3 is a schematic view showing the magnetic head slider in a state where it flies over the magnetic disk as viewed from an air outflow end side. FIG. 3(a) shows the magnetic head slider 13 of the related art, and FIG. 3(b) shows the magnetic head slider 1 according to an embodiment of present invention. Usually, the magnetic head slider 1 (or 13) flies over the rotating magnetic disk 15 in a position parallel to the magnetic disk 15, that is, in a state where a roll angle θr is zero at an air outflow end 16.

However, this roll angle θr is changed by the effect of a disturbance or the like. At this time, in the magnetic head slider 13 of the related art as shown in FIG. 3(a), the flying height of the lowest point 18 when the magnetic head slider flies is changed by a change in the roll angle θr, and a distance in the direction of height between the lowest point 18 and the magnetic disk 15 is decreased by δr. That is, the margin of the flying height of the distance, which is traveled by the magnetic head slider 13 until the magnetic head slider 13 contacts the surface of the magnetic disk 15, is lost by δr.

By contrast, in the magnetic head slider 1 as shown in FIG. 3(b), the read element 8 and the write element 9 are arranged on the spherical or ellipsoidal projection 12. Accordingly, the flying height of the lowest point 18 when the magnetic head slider flies is hardly changed by a change in the roll angle θr. That is, the margin of the flying height of the distance, which is traveled by the magnetic head slider 1 until the magnetic head slider 1 contacts the surface of the magnetic disk 15, is hardly lost.

Moreover, as described above, usually, the magnetic head slider is formed by laminating an alumina layer including a read element and a write element on an altic substrate. When the air-bearing surface of the magnetic head slider is manufactured, an altic part and an alumina part are manufactured at the same time, creating a step (manufacturing step) at a boundary portion due to a difference between their manufacturing rates. As shown in FIG. 4(a), the spherical or ellipsoidal projection 12 is arranged at the boundary portion between the altic part and the alumina part. A step 19 is created in a portion of the spherical or ellipsoidal projection 12, and this step portion is likely to be the lowest point when the slider flies.

However, in the embodiment shown in FIG. 4(b), the spherical or ellipsoidal projection 12 is arranged at a part of the alumina layer, so it is possible to avoid the step 19 from being formed on the spherical or ellipsoidal projection 12. Further, when a magnetic shield part constructing the read element 8 is formed across the boundary between the spherical or ellipsoidal projection 12 and the plane of the center rail surface 5, a problem such as corrosion at the boundary is likely to be caused. However, according to an embodiment of the present invention, the read element 8 and the write element 9 including the magnetic shield are arranged on the spherical or ellipsoidal projection 12, so such a trouble is not caused.

In one embodiment, the magnetic head slider 1 is constructed of the slider 10, which is constructed of the material of altic, and the thin film magnetic head part 11, which is constructed of alumina. One skilled in the art will appreciate that the respective parts may be constructed of other materials that capable of performing the same function.

As described above, in one embodiment, the read element 8 and the write element 9 are arranged on the spherical or ellipsoidal projection 12, and this entire projection 12 is formed in an alumina part, so a loss of margin of the flying height of the magnetic head slider 1 is reduced. Hence, high reliability may be secured. Moreover, since a manufacturing step is not caused at the projecting part, it is possible to prevent a flying margin from being reduced by the manufacturing step. Further, it is possible to prevent the corrosion of the read element 8.

Additionally, when the magnetic head slider flies, the flying height of the magnetic head slider is changed also by the effect of a wave or the like of the magnetic disk. That is, the dynamic stability of magnetic head slider is impaired. To secure the dynamic stability of the magnetic head slider, the capability of following the wave or the like of the magnetic disk needs to be enhanced. To enhance the following capability, it is effective to arrange the read element 8 and the write element 9 at the pressure center position of the center rail surface 5 of the air-bearing surface. However, in the magnetic head slider of the related art, the pressure center position of the center rail surface is at the slider part constructed of the material of altic, so the read element 8 and the write element 9 cannot be arranged at the pressure center position.

Figure 5:
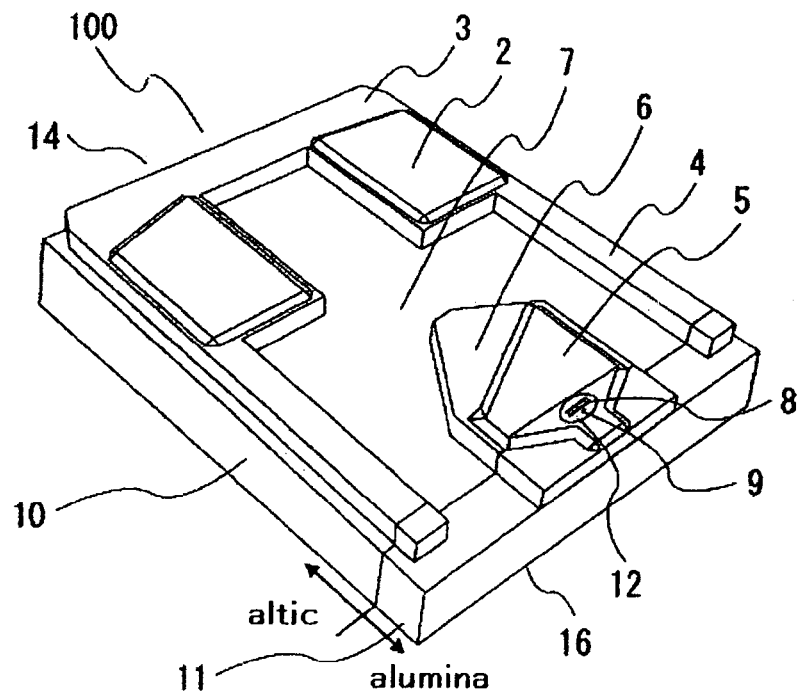
FIG. 5 is an exemplary plan view to show the shape of an air-bearing surface of a magnetic head slider according to an embodiment of the present invention.

Construction of a magnetic head slider solving this problem will be described by the use of FIG. 5 to FIG. 8. In FIG. 5 is shown a top view of a magnetic head slider 100 according to an embodiment of the present invention. The basic construction of the magnetic head slider 100 is essentially the same as other embodiments of the present invention. However, the spherical or ellipsoidal projection 12 having the read element 8 and the write element 9 arranged thereon, is arranged at the center position of pressure produced between the center rail surface 5 and the surface of the magnetic disk on the center rail surface 5 of the air-bearing surface of the magnetic head slider.

Figure 6:
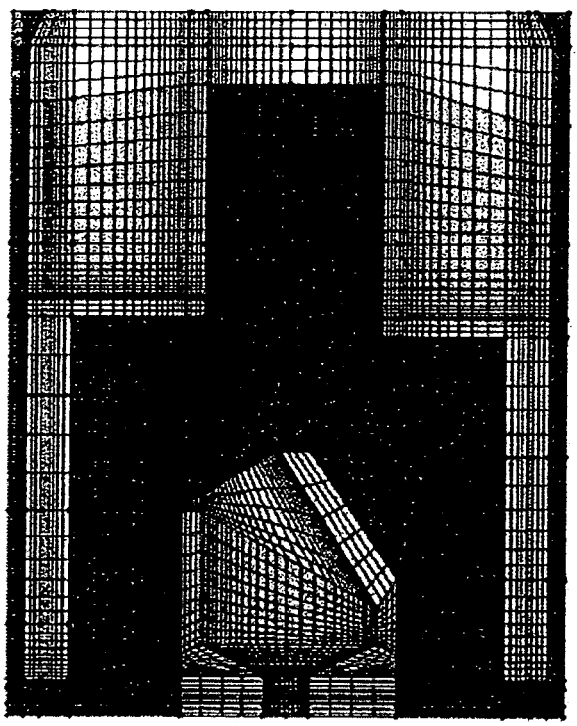
FIG. 6 is an exemplary diagram to show an air-bearing surface model of a magnetic head slider used for calculating a following capability according to an embodiment of the present invention.

In the construction example shown in FIG. 5, the read element 8 and the write element 9 may be arranged at the pressure center position of the center rail surface 5 by making a ratio of film thickness of the thin film head part 11 in the air-bearing surface of the magnetic head slider 100 to be 7% or more. Hereinafter, the reason of ground for this constituent ratio will be described. It is difficult to calculate a pressure center on the center rail surface 5 in the actual air-bearing surface. Accordingly, the capability of following the wave of the magnetic disk at respective positions on the center rail surface of the air-bearing surface of the magnetic head slider is calculated from a dynamic analysis calculation of the flying of the magnetic head slider, and a position on the center rail surface where this following capability becomes best is calculated. The magnetic head slider used for calculating the following capability is the same construction as in FIG. 1 and an air-bearing surface model is shown in FIG. 6.

Figure 7:
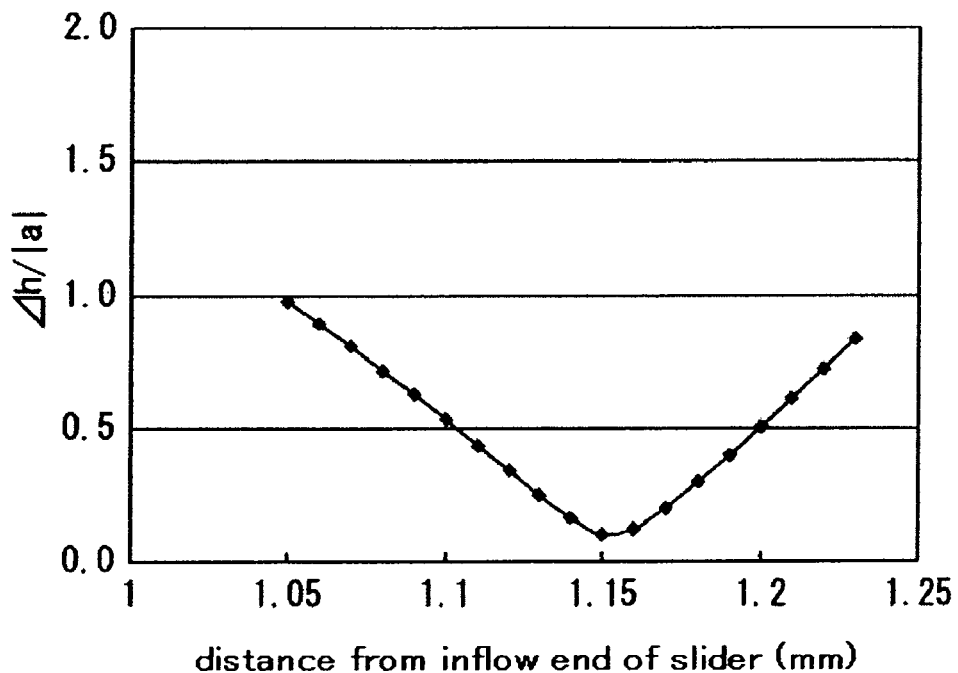
FIG. 7 is an exemplary graph to show results obtained by calculating a following capability by the use of the air-bearing surface model of FIG. 6 according to an embodiment of the present invention.

Results obtained by calculating the following capability by the use of this air-bearing surface model are shown in FIG. 7. A horizontal axis denotes a distance from the air inflow end 14 of the magnetic head slider 100, and a vertical axis denotes a parameter $\Delta h/|a|$ showing the capability of following the disk. The smaller this parameter is, the better the following capacity is. It is a disk wave larger than a slider length that the magnetic head slider may follow. This is about 25 kHz in terms of frequency, for example, considering that a magnetic slider used widely at the present time has a slider length of 1.25 mm and assuming that the rotational speed of the magnetic disk is 10,000 revolutions per minute. Thus, results obtained by calculating the root-mean-square values of data of 25 kHz or less in frequency are plotted in FIG. 7.

From FIG. 7, it is when the distance from the air inflow end 14 of the magnetic head slider is 1.15 mm that the following capability becomes best in the magnetic head slider 100 used this time. In the present magnetic head slider, the material at this position is altic and hence the read element and the write element cannot be arranged. Hence, to arrange the read element and the write element at a position where a distance from the air inflow end of the magnetic head slider is 1.15 mm, a portion where the distance from the air inflow end of the magnetic head slider ranges at least from 1.14 mm to 1.25 mm (110 μm in terms of a film thickness) needs to be made of an alumina layer.

Figure 8:
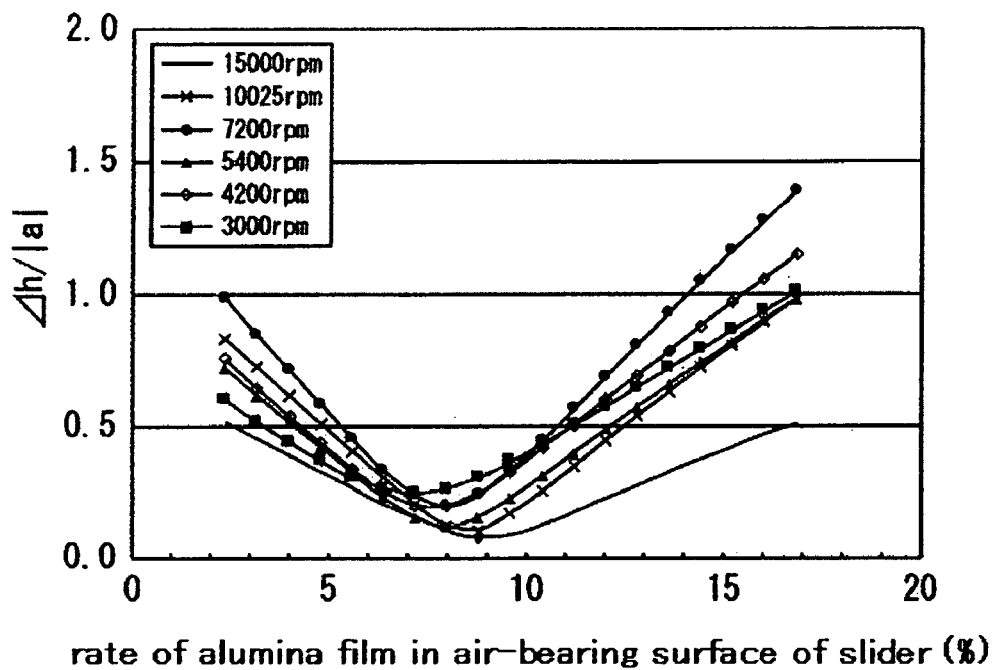
FIG. 8 is an exemplary graph to show the relationship between the thickness of an alumina film and the following capability of the slider according to an embodiment of the present invention.

It is in FIG. 8 that the calculation results obtained by the above-mentioned manner are shown in terms of the relationship between the thickness of an alumina film and the following capability of the slider. In the process of manufacturing a magnetic disk drive, the number of revolutions of the disk is reduced at the time of writing a servo signal used for positioning the direction of the track of the magnetic head slider. Thus, results obtained by performing calculations under the conditions of different numbers of revolutions of the magnetic disk are shown together.

Assuming that the read element 8 and the write element 9 are arranged at a position where the following capability of the slider becomes best for the respective numbers of revolutions of the disk and assuming that the distance from the boundary between attic and alumina to the read element 8 and the write element 9, i.e. the film thickness of the lower magnetic shield, is 10 μm, the ratio of the thickness of the alumina film was calculated. The length of the slider was fixed at 1.25 mm. Assuming that the thickness of the alumina film is 50 μm, the ratio of film thickness of the thin film head part 11 in the air-bearing surface of the magnetic head slider 100 to the entire length of the air-bearing surface of a current slider is about 4%. According to the calculation results, the ratio of film thickness of the thin film head part 11 in the air-bearing surface of the magnetic head slider 100 to the entire length of the air-bearing surface when the following capability becomes best is at least 7% or more (15% or less). Accordingly, it is found that, to make the following capability best, thickness of the alumina film needs to be made thicker than that of the current slider.

Here, when the write/read elements are arranged, for example, at a position 1.15 mm away from the slider inflow end 14 just as with the above-mentioned magnetic head slider 100, the space between the read element 8, the write element 9 and the magnetic disk becomes large, which is likely to be disadvantageous for recording or reproducing a signal. However, if the read element 8 and the write element 9 are arranged near the top of the spherical or ellipsoidal projection 12, the problem of the space between the write/read elements and the magnetic disk may be solved. As to the lowest flying point of the slider, if the height of this spherical or ellipsoidal projection 12 is as small as a height not to make an effect to the flying characteristics of the slider, there is no problem.

The above-mentioned embodiment relates to the magnetic head slider used widely at the present time and having a slider length of 1.25 mm. However, in the case of a magnetic head slider reduced in size and having a slider length of 0.85 mm, it is recommended that a portion where the distance from the air inflow end ranges at least from 0.74 mm to 0.85 mm be formed of an alumina layer. Moreover, in this case, the positions of the read element and the write element or the position of projection 12 are set at a position of about 0.75 mm away from the air inflow end of the magnetic head slider.

What is claimed is:

1. A magnetic head slider comprising:
   a slider; and
   a thin film magnetic head part formed at an air outflow end of the slider, wherein the slider and an air-bearing surface of the thin film magnetic head part have a front rail surface formed on the slider and a center rail surface formed across a boundary of the slider and the thin film magnetic head part, and the thin film magnetic head part of the center rail surface has an entire spherical or ellipsoidal projection formed thereon, the projection having a read element and a write element arranged thereon.

2. The magnetic head slider as claimed in claim 1, wherein the read element includes a lower magnetic shield, a magnetoresistance effect element, and an upper magnetic shield, and in that the write element is laminated on an upper portion of the read element, and in that the whole of the read element including the lower magnetic shield and the write element are included in the projection.

3. The magnetic head slider as claimed in claim 1, wherein the slider is constructed of alumina titanium carbide and in that the thin film magnetic head part is constructed of alumina covering the read element and the write element.

4. A magnetic head slider comprising:
   a slider; and
   a thin film magnetic head part formed at an air outflow end of the slider, wherein
   the slider and an air-bearing surface of the thin film magnetic head part have a front rail surface formed on the slider and a center rail surface formed across a boundary of the slider and the thin film magnetic head part, the ratio of a film thickness of the thin film head part in a length direction of the air-bearing surface to an entire length of the air-bearing surface from an air inflow end to the air outflow end of the magnetic head slider being 7% or more and 15% or less, and the thin film magnetic head part of the center rail surface has a spherical or ellipsoidal projection formed thereon, the projection having a read element and a write element arranged thereon.

5. The magnetic head slider as claimed in claim 4, wherein the read element and the write element are arranged at a pressure center position of the center rail surface.

6. The magnetic head slider as claimed in claim 4, wherein the projection is arranged at a pressure center position of the center rail surface.

7. The magnetic head slider as claimed in claim 4, wherein a portion where a distance from an air inflow end of the magnetic head slider ranges from 1.14 mm to 1.25 mm is the thin film magnetic head part.

8. The magnetic head slider as claimed in claim 4, wherein a portion where a distance from an air inflow end of the magnetic head slider ranges from 0.74 mm to 0.85 mm is the thin film magnetic head part.

9. The magnetic head slider as claimed in claim 4, wherein film thickness of the thin film magnetic head part is about 110 µm.

10. The magnetic head slider as claimed in claim 4, wherein the read element and the write element are arranged at a position of about 1.15 mm from an air inflow end of the slider.

11. The magnetic head slider as claimed in claim 4, wherein the projection is arranged at a position of about 1.15 mm from an air inflow end of the slider.

12. The magnetic head slider as claimed in claim 4, wherein the read element and the write element are arranged at a position of about 0.75 mm from an air inflow end of the slider.

13. The magnetic head slider as claimed in claim 4, wherein the projection is arranged at a position of about 0.75 mm from an air inflow end of the slider.

* * * * *